United States Patent [19]

Goyer

[11] 3,816,765

[45] June 11, 1974

[54] DIGITAL INTERFACE CIRCUIT FOR A RANDOM NOISE GENERATOR

[75] Inventor: Ronald Bruce Goyer, North Hollywood, Calif.

[73] Assignee: RCA Corporation, New York, N.Y.

[22] Filed: Apr. 30, 1973

[21] Appl. No.: 355,444

[30] Foreign Application Priority Data

June 27, 1972 Great Britain .................... 30038/72

[52] U.S. Cl. ............. 307/260 A, 307/208, 307/235, 307/264, 330/30 D, 331/78

[51] Int. Cl. ............................................. H03k 5/00

[58] Field of Search ....... 307/260, 260 A, 215, 230, 307/235, 264, 208; 328/59; 330/25–27, 30 D, 69; 331/78

[56] References Cited

UNITED STATES PATENTS

| | | | |
|---|---|---|---|
| 2,767,315 | 10/1956 | Kosten | 331/78 |
| 2,980,866 | 4/1961 | Naines, Jr. | 331/78 |
| 3,602,741 | 8/1971 | Ressler et al. | 307/264 |
| 3,675,148 | 7/1972 | Edwards | 330/25 |

*Primary Examiner*—Stanley D. Miller, Jr.

*Attorney, Agent, or Firm*—Edward J. Norton; Joseph D. Lazar

[57] ABSTRACT

An interface circuit arrangement between a random noise generator circuit and an output digital logic integrated circuit. The interface circuit includes a digital logic integrated circuit which has impedance levels and voltage levels compatible with that of the output digital logic integrated circuit and which is connected within a closed loop including a differential amplifier which biases the interface digital logic integrated circuit into a symmetrical amplification region substantially midway within its linear range of operation thereby removing a threshold selectivity which otherwise reduces the randomness of the output of the random noise generator.

11 Claims, 2 Drawing Figures

PATENTED JUN 11 1974

3,816,765

SHEET 1 OF 2

DIGITAL INTERFACE CIRCUIT FOR A RANDOM NOISE GENERATOR

CROSS REFERENCE TO RELATED APPLICATIONS

Of interest are the following copending patent applications, Ser. No. 735,716 filed June 10, 1968, now U.S. Pat. No. 3,755,811, entitled "Discriminating Signal System," and Ser. No. 27,403 filed Apr. 10, 1970, entitled "Separation Control of Aircraft by Non-Synchronous Techniques," both based on the inventions of Jack Breckman, now about to issue; also a patent application Ser. No. 355,448, filed on Apr. 30, 1973 entitled "Correlator and Control System for Vehicular Collision Avoidance" based on the invention of Ronald Bruce Goyer, all of which patent applications being assigned to the same assignee as the assignee of the patent application.

BACKGROUND OF THE INVENTION

1. Field of the Invention

The present invention relates to electronic random noise generation and more particularly to a circuit for interfacing a random noise generator to a digital logic output circuit.

Random noise signals have a wide range of uses such as for RF probe signals in radar systems as well as for test signals for electronic equipment, and, in particular, to determine the frequency response, stability and power handling capability of amplifiers; calibration signals for both low and high frequency radio receivers, radar systems, and radio receiver equipment for analysis of cosmic noise; random stimulation of computers to determine stability; random sound signals for composition of electronic music; a source of random numbers for statistical use; signals in electronic counter measure systems; and in destructive testing of electronic components.

2. Description of the Prior Art

Random or white noise generation circuits are well known. However, when a random noise generator circuit is coupled to a utilization circuit including digital logic elements by which the random noise signal is to be processed, problems arise due to the digital logic elements not being generally electrically compatible with the random noise generator circuit. Moreover, interface circuits conventionally used to couple a random noise signal to a digital logic processing circuits introduce threshold levels which act selectively to remove certain random spikes or pulses from the random signal which fall outside the threshold levels and thereby reduce the randomness of the random noise signal.

SUMMARY OF THE INVENTION

In accordance with the invention an interface circuit, coupling an input AC signal to an output logic gate, comprises a differential amplifier, a logic gate compatible with the output logic gate, and a DC path forming a closed loop wherein the differential amplifier generates signals in response to the direction of change of the output signals of the logic circuit to bias the logic circuit midway in its linear region of operation. One input of the differential amplifier is receptive of the input AC signal while its output is directly coupled to an amplifier included within the logic gate. The output of the logic circuit is coupled to an input of the output logic circuit and, through a DC path, to the first input and a second input of the differential amplifier. The DC path couples substantially equal portions of the signal generated at the output of the logic gate to the two inputs of the differential amplifier. An AC impedance is provided for attenuating AC signals coupled to the second terminal of the differential amplifier. The interface circuit of the invention functions to amplify equally positive going and negative going portions of AC signal inputs and provide a compatible interface with logic circuitry.

DETAILED DESCRIPTION OF A PREFERRED EMBODIMENT

Some systems utilizing a random noise generator require the random noise signal to be as nearly free of any predictable patterns within the random noise signal as possible. Such systems must have provisions for eliminating any threshold levels which would remove any portion of the random signal with predictable selectivity and must also ensure that no predictable or non-random portions are added to the random noise signal such as periodic oscillations. One such system requiring a nearly perfect random noise signal is the SECANT anti-collision system for aircraft; SECANT being an acronym for Separation Control of Aircraft by Non-Synchronous Techniques. The basic concept of the SECANT system involves the accumulation or integration of incoming RF return or reply signals received in response to a set of transmitted RF probe signals transmitted in accordance with a random or psuedo-random code. Further details of the SECANT system are described in copending U.S. Pat. application Ser. No. 27,403, filed Apr. 10, 1970 by Jack Breckman and assigned to the same assignee as the present application. The random noise generator circuit is particularly useful in a form of the SECANT correlator and control system described in copending application Ser. No. 355,448 filed on Apr. 30, 1973, based on the invention of Ronald Bruce Goyer, entitled "Correlator and Control System for Vehicular Collision Avoidance," assigned to the common assignee.

Figure 1:
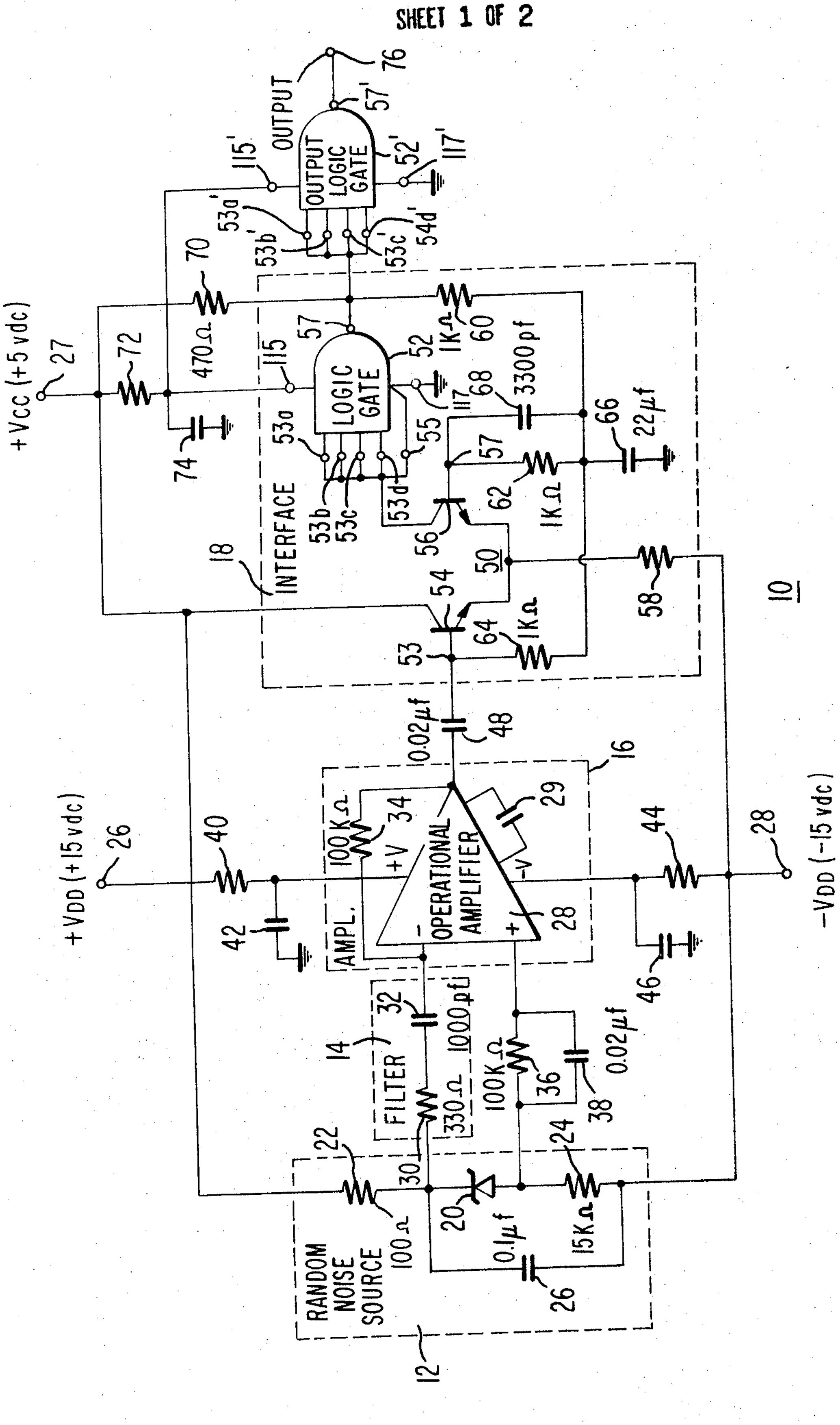
FIG. 1 is a schematic of a random noise generator circuit embodying the invention.

Reference is now made to FIG. 1, which is a schematic of a circuit embodying the present invention useful in generating a random noise signal. Random noise circuit 10 comprises random noise source 12 coupled through filter circuit 14 to amplifier stage 16, which is in turn coupled to an output digital logic gate 52' by interface circuit 18.

The random noise source 12 includes a zener noise diode 20, which is reverse biased into its avalanche region. The bias circuit includes bias resistor 22 and bias resistor 24 connected in series with zener noise diode 20 between power supply terminals 27 and 28. Bias resistors 22 and 24 establish the current flowing in the zener noise diode 20 bias path between supply voltage $+V_{CC}$, made available at supply terminal 27, and supply voltage $-V_{DD}$, made available at supply terminal 28. When zener noise diode 20 is properly biased in its avalanche region as is known in the art, it is a source of signal which consists of pulses occurring at random intervals and being of random amplitude and pulse width. A typical type of zener noise diode, which may be used in random noise generator 20, is the Soundvistor type SD20 diode manufactured by Solitron Devices Incorporated. In circuit 10 bias resistor 22 is typically 100 ohms and bias resistor 24 is typically 15 kilo-ohms. Under such bias conditions, the zener is biased for 8 or 9 volts DC of zener action and produces a random noise signal having a frequency spectrum between less than 20 Hertz and greater than 3 Megahertz.

Capacitor 26 is connected across the series combination of noise zener 20 and bias resistor 24 to filter out the undesirable variations of voltage due to power supply drift. Power supply drift, although being somewhat random, is sufficiently periodic to add predictable signal portions to the random noise signal. Capacitor 26 is typically in the order of 0.1 microfarads.

The cathode (terminal 21) of zener noise diode 20 is coupled to the inverting (−) input of operational amplifier 28 through high pass filter 14 comprising resistor 30 and capacitor 32. High pass filter 14 ensures that operational amplifier 28 receives only those signals which are rich in high frequency components. Resistor 30 has a typical value of 330 ohms, while capacitor 32 has a typical value of 1,000 picofarads, thereby establishing the 3db frequency cut-off point of high pass filter 14 at 0.5 Megahertz.

Operational amplifier 28 is operated in a closed loop configuration comprising feedback resistor 34 connected between the inverting (−) input and output of operational amplifier 28. The gain of amplifier stage 16, including operational amplifier 28, is determined by the ratio of resistance vlaue of feedback resistor 34 and the impedance of the high pass filter 14. If feedback resistor 34 is 100 kilo-ohms, the gain of amplifier 16 at a frequency above the 3db point of high pass filter 14 is approximately 300.

Resistor 36 couples the anode of zener noise diode 20 to the non-inverting (+) input of operational amplifier 28. The value of resistor 36 is chosen as equal to the value of feedback resistor 34 to insure that the voltage established at inverting (−) input by the DC currents flowing to the inverting (−) input through feedback resistor 34 is substantially equal to the voltage established at non-inverting (−) input by the DC current flowing to the non-inverting (+) input through bias resistor 36. This balanced bias arrangement essentially ensures that operational amplifier 28 amplifies both positive and negative going signals equally. This feature is especially desirable since any unsymmetrical operation within the random noise generator circuit tends to develop threshold conditions which eliminate portions of the random noise signal and thereby make the random noise signal more predictable, i.e. less random. For instance, if positive going noise signals are amplified more than negative going noise signals, the randomness of random noise signal will be diminished since only signals above a certain threshold level will contribute to the random noise output.

The inherent capacitance to ground, not shown, associated with non-inverting (+) input of the amplifier 28 and resistor 36 form a low pass filter which may reduce the gain of amplifier 16 at high frequencies. Capacitor 38 is a high frequency bypass capacitor, which essentially bypasses resistor 36 in the frequency range of interest to neutralize the adverse effect of the low pass filter and thereby maintain the gain of amplification stage 18 constant over the range of frequencies of interest. Capacitor 38 is typically in the order of 0.2 microfarads.

A suitable operational amplifier 28 of conventional type is readily available in the industry such as exemplified by the μ715C operational amplifier manufactured by Fairchild Camera and Instruments Corporation.

Operational amplifier 28 is coupled both to a positive and negative supply voltage respectively, $+V_{DD}$ volts DC and $-V_{DD}$ volts DC. Supply voltage $+V_{DD}$ and $-V_{DD}$ are chosen to be equal in magnitude so as to prevent imbalances in operation which would otherwise effectively act to selectively eliminate portions of the random noise signal. Typically, the magnitude of supply voltages $+V_{DD}$ and $-V_{DD}$ is 15 volts DC. If negative supply voltage $-V_{DD}$ was less in magnitude than positive supply voltage $+V_{DD}$, operational amplifier 28 would tend to discriminate against negative going noise pulses in that positive going noise pulses would be amplified to a greater extent than negative going noise pulses.

Two conventional R-C line filters are provided to filter noise present on the $+V_{DD}$ and $-V_{DD}$ lines before reaching operational amplifier 28. Supply line noise is generally not random and should be eliminated to prevent the addition of non-random components to the random noise signal. The line filter for positive supply voltage $+V_{DD}$ comprises resistor 40 coupling positive supply voltage $+V_{DD}$ to the positive power supply terminal (+V) of operational amplifier 28 and shunt capacitor 42 connected between the positive power terminal (+V) of operational amplifier 28 and ground. Resistor 44 and capacitor 46 are similarly connected to provide filtering for negative supply voltage $-V_{DD}$.

Operational amplifier 28 is also provided with a compensation capacitor 29 selected according to the internal parameters of the operational amplifier which is used to prevent oscillations. Most manufacturers recommend the value of the compensation capacitor in accordance with the gain configuration in which the operation amplifier is to be used. In the alternative, the operational amplifier manufacturer may recommend an R-C compensation network. If operational amplifier 28 were allowed to oscillate, a substantially periodic and therefore predictable signal would be superimposed on the random noise signal, as is known in the art.

The output of operational amplifier 28 is coupled to the input of interface circuit 18 through DC blocking capacitor 48. DC blocking capacitor 48 has a typical value of 0.02 microfarads. The purpose of DC blocking capacitor 48 is to insure that only AC components of the random noise signals reach the input of interface circuit 18. If DC components were allowed to reach interface circuit 18, threshold voltages would be set up and would eliminate portions of the random noise signal.

Interface circuit 18 comprises a differential amplifier 50 and a logic gate 52 connected in a closed loop circuit so as to bias logic gate 52 essentially midway in its active region of operation. Differential amplifier 50 comprises NPN transistors 54 and 56 connected in conventional differential amplifier configuration. The emitters of transistors 54 and 56 are jointly connected to one end of resistor 58, the other end of resistor 58 being connected to negative supply voltage $-V_{DD}$ made available at supply terminal 28. Resistor 58 establishes the quiescent operating currents flowing through the emitter-collector paths of transistors 54 and 56. Resistor 58 typically has a value of 8.2 kilo-ohms. The collector of transistor 54 is connected to positive logic supply voltage $+V_{CC}$ made available at terminal 27. Typically, the magnitude of supply voltage $+V_{CC}$ is 5 volts DC. The output voltage of differential amplifier 50 is established at the collector of transistor 56. The collector of transistor 56 is directly connected to jointly connected input terminals 53*a* through 53*d* and 55 of logic gate 52. The characteristics of logic gate 52 will later be described with reference to FIG. 2. Output terminal 57 of logic gate 52 is coupled through a resistive coupling circuit comprising resistors 60, 62 and 64 to both input terminals 53 and 57 of differential amplifier 50 at the bases of transistors 54 and 56, respectively. Resistors 62 and 64 are connected in series between the bases of transistors 54 and 56. Resistor 60 is connected between output terminal 57 of logic gate 52 and the common connection junction between resistors 62 and 64. This resistive feedback path closes the loop between differential amplifier 50 and logic gate 52 and provides the feedback signals which insure that logic gate 52 operates essentially midway in its linear or active region. Resistors 62 and 64 are equal so as to provide a balanced DC feedback signal from logic gate 52 to each of the inputs of differential amplifier 50. In random noise generator 10, resistors 60, 62, 64 each have typical values of 1 kilo-ohms.

Capacitor 66 is connected between the common connection junction of resistors 62 and 64 and ground and provides stability for the closed loop circuit comprising differential amplifier 50 and logic gate 52. Capacitor 66, in combination with resistor 60, comprises a low pass filter which provides that the open loop characteristics of the closed loop circuit comprising differential amplifier 50 and logic gate 52 has a frequency response curve which has a slope of approximately −6db per octave as it crosses the zero gain axis, thereby insuring, as is well known in the art, that the closed loop circuit will not oscillate. Capacitor 66 has a typical value of 22 microfarads. It is to be noted that any oscillations generated within the random noise circuit will, in general, be substantially periodic and, therefore, will reduce the randomness of the random noise signal. Capacitor 66 and resistor 66 prevent oscillations in the interface circuit portion 18 of noise generator circuit 10.

Resistor 60 and capacitor 66 also form an integrator which integrates or produces the average DC value of the output signal of logic gate 52. This average DC voltage is established across capacitor 66 and will have a magnitude of exactly one half the peak-to-peak output voltage plus any DC offset voltage output 57 of logic gate 52 if the random signal is perfectly random. The DC voltage developed across capacitor 66 provides a bias voltage for differential amplifier 50.

Capacitor 68, connected across resistor 62, provides a low impedance AC path to ground for the input of differential amplifier 50 at the base of transistor 56. The input of differential amplifier 50 at the base of transistor 54 is not shunted to ground, and therefore receives more of the random noise signal from the output of operational amplifier 28 than does the input of differential amplifier 50 at the base of transistor 56. Capacitor 68 has a typical value of 3,300 picofarads. Capacitor 68 is selected so that virtually all of the random noise signal is applied to the base of transistor 54 rather than to the base of transistor 56. As a consequence of using shunt capacitor 68, the inputs of differential amplifier 50 are imbalanced with regard to AC signals and therefore the gain attained from differential amplifier 50 is significantly larger than the gain without the use of shunt capacitor 68.

The differential amplifier 50 is used to amplify the random noise signal from operational amplifier 28. Capacitor 48 couples the output of operational amplifiers to the input of differential amplifier 50, which is the base terminal of transistor 54. The output of differential amplifier 50 is available at the collector of transistor 56, which in turn, is directly applied to the jointly connected inputs 53a through 53d and 55 of logic gate 52.

The output of logic gate 52 is directly connected to jointly connected inputs 53*a*′ through 53*d*′ of output logic gate 52′. Output logic gate 52′ and logic gate 52 are selected to be electrically compatible, that is, the output impedance level of logic gate 52 is compatible with the input of impedance level of logic gate 52′ and the voltages produced at output 57 of logic gate 52 are readily of such magnitude as to be accepted and utilized by output logic gate 52′.

A power line filter comprising series resistor 72, connected between power supply terminal 27 and the power supply inputs of logic gates 52 and 52′, and shunt capacitor 74, connected in shunt with the power supply inputs to logic gates 52 and 52′ and ground, removes substantially all of the noise from power supply voltage $+V_{CC}$, which would be otherwise applied to logic gates 52 and 52′. As was stated before, non-random noise would adversely affect the performance of a system employing random noise generator 10.

Output terminal 76 is connected to output terminal 57′ of logic gate 52′. The voltage at output terminal 76, consists of pulses having random pulse widths and occurring at random intervals, but having substantially uniform peak-to-peak amplitude, corresponding to the voltage between the logic high level (approximately $+V_{CC}$) and logic low level (approximately ground potential) of output logic gate 52′.

It is to be noted that the output voltage at terminal 76 may contain pulses whose amplitude does not reach the logic low or logic high voltage levels due to the inherent switching speed limitations of logic gate 52′, are are well known in the art.

Logic gate 52 and 52′ are each NAND gates. It should be noted that logic gate 52 need not be identical to logic gate 52′. It is, however, preferable that logic gate 52 be of the same logic family as logic gate 52; that is, if logic gate 52 is a DTL (diode transistor logic) element logic gate 52′ should preferably be a DTL logic element. For instance, logic gate 52 may be a logic INVERTER while output logic gate 52′ is a NAND or NOR gate.

Figure 2:
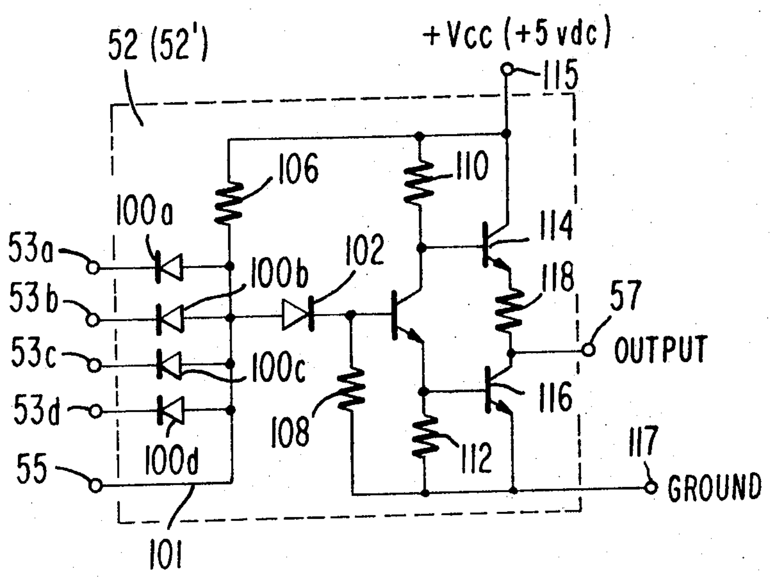
FIG. 2 is a schematic of a typical digital logic gating element which may be used in the circuit of FIG. 1.

Before describing the operation of random noise generator circuit 10, reference is now made to FIG. 2, which is a schematic of a typical NAND gate which may comprise logic gates 52 and 52′. NAND gate 52 is readily available in the industry from such manufacturers as Signetics. Other manufacturers, such as Fairchild, Texas Instruments, and RCA manufacture similar suitable logic elements which may also comprise logic gates 52 and 52′. The Signetics version of NAND gate 52 has model number N8416A. A detailed specification and description of applications of the Signetics N8416A may be found in the Signetics *DCL Designers Choice Logic Specifications handbook*, volume 1 37 logic Elements" on pages 2–4 through 2–5 and 4–1 through 4–3, respectively.

Input terminals 53*a* through 53*d* of NAND gate 52 are coupled to the anode of diode 102 through input diodes 100*a* through 100*d*, respectively. Extender input terminal 55 is directly connected to the anode of diode 102 by conductor 101. Input diodes 100*a* through 100*d* are poled in opposition to input diode 102 to perform the AND function and to prevent loading of the devices connected to input terminals 53*a* through 53*d*, as is well understood in the art. Extender terminal 55 is provided to allow for the addition of additional AND function diodes poled in like manner to input diodes 100*a* through 100*b*. At the common junction of the anodes of input diodes 100*a* through 100*b*, conductor 101 and the anode of diode 102 is also connected to one end of pull-up resistor 106. Power supply $+V_{CC}$ is applied to the other end of pull-up resistor 106 through power supply terminal 115. It is to be noted that pull-up resistor 106 also serves as the collector load for transistor 56 of FIG. 1. Diode 102 is poled in the same direction as the base emitter junction of NPN transistor 104 and is directly coupled to its base electrode, which, in turn, is coupled through biasing resistor 108 to ground connected to terminal 117. A conduction path consisting of, in the order named, resistor 110, the collector-emitter conduction path of NPN transistor 104 and resistor 112 is connected between supply voltage $+V_{CC}$ and ground. The collector of transistor 104 is directly connected to the base of transistor 114. The emitter of transistor 104 is directly connected to the base of transistor 116. Another conduction path consisting of, in the order named, the collector-emitter conduction path of NPN transistor 114, resistor 118, and the collector emitter conduction path of NPN transistor 116 is also connected between power supply voltage $+V_{CC}$ and ground. The output of logic gate 52 is developed at output terminal 57, which is directly connected to the collector of transistor 116.

A significant feature of NAND gate 52 is that it provides for a direct conduction path (conductor 101) to its amplification portions comprising transistors 104, 114, and 116, thereby bypassing input diodes 100a through 100d. If the random noise signal at the collector of transistor 56 of FIG. 1 were applied to an input diode, 100*a* through 100*d*, positive going portions of the random noise signal would not be conducted to the amplification portions of NAND gate 52, since input diodes 100*a* through 100*d* are reversed biased by positive going input signal and the positive going portions of the random noise signal would, therefore, be eliminated. It is to be noted that diode 102 presents no such problem for negative going portions of the random noise signal since diode 102 is always biased into conduction by the conduction path provided by pull up resistors 106 and bias resistor 108, and by the operation of interface circuit 18, as will be described.

In general, the operation of NAND gate 52 is conventional. Briefly, if all the input voltages at input terminals 53*a* through 53*d* and 55 are at a high potential, transistor 104 will be biased ON causing the voltage at its collector to drop and the voltage on its emitter to rise. As a result, transistor 116 will be turned ON while transistor 114 will be turned OFF, causing a logic low (approximately ground potential) to be established at output terminal 57 (the collector of transistor 116). If any one of the input voltages at input terminals 53*a* through 53*d* and 55 are at a low potential, the potential of the anode of diode 102 drops causing transistor 104 to be biased OFF. When transistor 104 is biased OFF, the voltage at its collector is high while the voltage at its emitter is low. As a result, transistor 114 will be turned ON while transistor 116 will be turned OFF, causing a logic high (approximately $+V_{CC}$) to be established at output terminal 57 (the collector of transistor 116). In random noise generator circuit 10 of FIG. 1, all the input terminals of logic gates 52 and 52' are jointly connected so that each gate functions as an inverter. Extender input terminal 55' of output logic gate 52' is not used to prevent loading the output of logic gate 52. That is, if input diodes 100*a* through 100*d* of logic gate 52' were bypassed, the output of logic gate 52 would be loaded down in that it would be connected to ground through diode 102 and the base-emitter junctions of transistors 104 and 116 of logic gate 52'.

DESCRIPTION OF THE OPERATION OF THE CIRCUIT OF FIG. 1

In operation zener referring particularly to FIG. 1, noise diode 20 is biased to develop a random noise signal between its cathode and anode. This random noise signal consists of pulses of varying amplitudes and pulse widths which occur at random intervals. The random noise signal established across random noise diode 20 is in the low microvolt range. The random noise signal is applied across the inverting (−) and non-inverting (+) inputs of operational amplifier 28 by filter circuit 14 and the R-C network comprising resistor 36 and bypass capacitor 38. High pass filter 14 provides that the signal reaching operational amplifier 28 is rich in high frequency content.

Operational amplifier 28 is configured, as described previously, in combination with feedback resistor 34, the R-C network comprising resistor 36 and bypass capacitor 38, and filter circuit 14 to provide a gain of approximately 300 with the typical values as shown in FIG. 1. With such a gain the signal at the output of operational amplifier 28 is in the high microvolt or low millivolt range. As was previously indicated, it is important to have operational amplifier 28 DC biased symmetrically with respect to its power supply inputs (+V and −V) and its inverting (−) and non-inverting (+) inputs. Without this balanced DC operation, internal active devices within operational amplifier 28 would tend to cause unsymmetrical or unequal amplification of the positive and negative portions of the input noise signal, causing the elimination of portions of the random noise signal as previously explained.

The output signal of operational amplifier 28 is fed to the input of differential amplifier 50 at the base of transistor 54 through DC blocking capacitor 48 which eliminates DC components of the random noise output signal produced by operational amplifier 28. Differential amplifier 50 is operated in a single ended output mode providing a high gain which further amplifies the random noise output signal from operational amplifier 28. Resistor 58 establishes the DC bias current flowing through transistors 54 and 56 of differential amplifier 50. The single ended output of differential amplifier 50, available at the collector of transistor 56, is directly coupled to extender input terminal 55 of logic gate 52. As was previously described, the use of extender terminal 55 provides a conduction path which bypasses input ANDing diodes 100*a* through 100*d* of logic gate 52. To prevent unwanted noise pick up, all the input terminals 53*a* through 53*d* and 55 are jointly connected.

In order to provide proper interfacing with output logic gate 52′ (which in this embodiment is identical with interface logic gate 52) logic gate 52 is connected in a closed loop with differential amplifier 50 through a resistive circuit comprising resistors 60, 62, and 64. This resistive network provides identical portions of the output signal from logic gate 52 to the two differential inputs of differential amplifier 50 at the base electrodes of transistors 54 and 56. It is important that the differential DC input signals to differential amplifier 50 are balanced so as to prevent the elimination of portions of the random noise signal and to best take advantage of the common mode characteristics of differential amplifier 50 as are well known in the art. The common mode characteristics of differential amplifier 50 tend to cause the cancellation of voltage offsets inherent in logic gate 52 which would otherwise cause the elimination of portions of the random noise signal. The stability of the closed loop is maintained, as was previously described, by the roll-off characteristics of the low pass filter comprising resistor 60 and capacitor 66.

The DC operation of the closed loop comprising logic gate 52 and differential amplifier 50 biases logic gate 52 substantially midway in its active region of operation. The operation of the closed loop comprising logic gate 52 and differential amplifier 50 can best be understood by considering its response in acting to oppose the possible two extreme output voltage levels of logic gate 52.

During the following description concurrent reference should be made to FIGS. 1 and 2.

In a first case it will be assumed that the output voltage of logic gate 52 is driven toward $+V_{CC}$. An output voltage of logic gate 52 approaching $+V_{CC}$ implies that diode 102 is not conducting current to the base of transistor 104, and thereby causing transistor 104 to be driven OFF, transistor 114 to be driven ON, and transistor 116 to be driven OFF. If diode 102 is to be nonconducting, the current flowing through resistor 106 must be substantially diverted away from the anode of diode 102 and caused to flow through path 101 to the collector of transistor 56. As will be shown, the operation of the closed loop comprising differential amplifier and logic gate 52 tends to cause a current to flow out of the collector of transistor 56, through path 101, and toward the anode of diode 102 when a voltage approaching $+V_{CC}$ is assumed to be established at output terminal 57 of logic gate 52.

An equal portion of the output voltage of logic gate 52, in this case a voltage approaching $+V_{CC}$, is applied through resistor 60 and resistors 64 and 62 to the bases of transistors 54 and 56, respectively, and causes both transistor 54 and 56 to conduct. Since the collector of transistor 54 is connected to supply voltage $+V_{CC}$, current will be conducted through transistor 54 from its collector to its emitter. Since the collector of transistor 56 is connected to input terminal 55 of logic gate 52 the highest voltage that is developed at the collector of transistor 56 is equal to the sum of the semiconductor junction voltage drops of diode 102, the base-emitter junction of transistor 104, and the base-emitter junction of transistor 116. As the output voltage of logic gate 52 rises toward $+V_{CC}$ transistor 56 conducts more heavily and becomes biased closer to saturation. Before transistor 56 reaches saturation current from resistor 106 flows between the collector and emitter of transistor 56. When the voltage of the output of logic gate 52 exceeds the sum of the junction voltage drops of the base-collector junction of transistor 56, diode 102, the base-emitter junction of transistor 104, and the base-emitter junction of transistor 116 the base-collector junction of transistor 56 becomes forward biased and current begins to flow between the base and collector of transistor 56. As the output voltage of logic gate 52 increases, the current flowing through the base-collector junction of transistor 56 toward diode 102 also increases. As the voltage at the output voltage of logic gate 52 gets closer to $+V_{CC}$ transistor 56 becomes even more saturated. Eventually, there is sufficient current flowing through the base-collector junction of transistor 56 toward diode 102, together with the current now available from resistor 106, to cause diode 102 to conduct. When diode 102 conducts transistor 104 is driven ON, transistor 116 is driven ON, and transistor 114 is driven OFF, thereby causing the output voltage of logic gate 52 to fall.

In a second case, it will be assumed that the output voltage of logic gate 52 is driven toward ground potential. An output voltage of logic gate 52 approaching ground potential implies that diode 102 is conducting current to the base of transistor 104 and thereby causing transistor 104 to be driven ON, transistor 114 to be driven OFF, and transistor 116 to be driven ON. If diode 102 is to be conducting the current from resistor 106 must be able to flow into the anode of diode 102. In other words, the collector of transistor 56 should not provide a path whereby a substantial portion of the current from resistor 106 is drawn away from diode 102. As will be shown, the operation of the closed loop comprising differential amplifier 50 and logic gate 52 tends to prevent a substantial amount of current from reaching diode 102 when a voltage approaching ground potential is assumed to be established at output terminal 57 of logic gate 52.

An equal portion of the output voltage of logic gate 52, in this case a voltage approaching ground potential, is applied through resistor 60 and resistors 64 and 62 to the bases of transistors 54 and 56, respectively, and causes both transistors 54 and 56 to be biased toward an OFF condition. It should be noted that common emitter resistor 58 of transistors 54 and 56 is connected to supply voltage $-V_{DD}$, which has a value of −15 volts DC, and therefore, to bring transistors 54 and 56 to a fully OFF condition requires that the output voltage of logic gate 52 be driven approximately to −15 volts DC. Since the lowest potential possible at output terminal 57 of logic gate 52 is approximately ground potential transistors 54 and 56 are never driven fully OFF and the current conducted by both transistor 54 and 56 decreases but never reaches a value of zero. In accordance with the decreasing current flowing through the collector-emitter conduction path of transistor 56, the voltage at the collector of transistor 56 (terminal 55) increases thereby causing an increase in the current flowing to diode 102. However, if the value of resistor 58 is judiciously selected with regard to the lowest potential possible at output terminal 57 of logic gate 52 and pull-up resistor 106, which serves as the collector load resistor of transistor 56, so that the voltage at the collector of transistor 56 will not exceed the sum of the semiconductor junction voltage drops of diode 102, the base-emitter junction of transistor 104 and the base-emitter junction of transistor 116 sufficient current to cause diode 102 to conduct will be prevented from reaching diode 102 and transistors 104 and 116 will not turn ON and transistor will not turn OFF thereby preventing the output voltage of logic gate 52 to fall even further.

If the current input required to cause the output voltage of logic gate 52 to fall to a logic low (approximately ground potential) is specified by the manufacturer of logic gate 52, it is believed that resistor 58 should be selected such that the current flowing through it when the output of logic gate 52 is assumed to be at a logic low is no less than twice the input current required to produce a logic low at the output of logic gate 52 since the current flowing through resistor 58 is approximately equally shared by transistors 54 and 56. For example, the input current required to cause the output voltage of logic gate 52 to fall to a logic low is specified as 0.8 milliamperes by Signetics. A selection of 8.2 kilo-ohms as the value of resistor 58 together with the other values as indicated in interface 18 of FIG. 1 provides a current of greater than 1.6 milliamperes is available to be shared by transistors 54 and 56.

In summary, differential amplifier 50 acts to both amplify the incoming random noise signal from operational amplifier 28 and to provide a feedback path for logic gate 52 which biases it midway in its linear region of operation. It is further noted, that by providing equal DC feedback to both inputs of operational amplifier 50 the bias point of operational amplifier 50 is not altered and its gain does not change, but, nevertheless it biases logic gate 52 for proper linear operation.

The output of logic gate 52 is fed into the commonly joined input terminals 53*a'* to 53*d'* of logic gate 52'. Logic gate 52' inverts the input signal and correspondingly provides a random noise output which has varying pulse widths occurring at random intervals but being substantially of constant peak-to-peak amplitude.

What is claimed is:

1. An interface circuit for coupling an input AC signal to an output logic circuit, comprising:

a logic circuit compatible with said output logic circuit, said logic circuit having an input terminal and an output terminal, said output terminal being coupled to an input terminal of said output logic circuit, said logic circuit including an amplifier directly coupled to said input terminal;

a differential amplifier having first and second input terminals and an output terminal, said first input terminal adapted to receive said input AC signal, said output terminal being coupled to said input terminal of said logic circuit;

a DC path coupling said output terminal of said logic circuit to said first and second input terminals for applying substantially equal portions of an output interface signal generated at said output terminal of said logic circuit to said first and second input terminals, said differential amplifier generating a signal in response to said output interface signal to cause said logic circuit to operate substantially midway in its linear region of operation whenever said output interface signal exceeds a first predetermined value while changing in a first sense;

AC impedance means for attenuating AC signals coupled to said second terminal; and means for biasing said differential amplifier to prevent signals at said input terminal of said logic circuit from exceeding a second predetermined value to cause said logic circuit to operate substantially midway in its linear region of operation while said output interface signals is changing in a sense opposite to said first sense.

2. The interface circuit recited in claim 1 wherein said differential amplifier comprises:

first and second transistor of the same conductivity type having base, emitter, and collector electrodes, said base electrode of said first transistor being coupled to said first input terminal, said base electrode of said second transistor being coupled to said second input signal, said emitter electrodes being coupled to said biasing means, said collector of said first transistor being adapted to receive a first fixed potential, said collector of said second transistor being coupled to said input of said logic circuit.

3. The interface circuit recited in claim 2 wherein said biasing means includes means for applying a second fixed potential and a bias resistor coupled between said emitters of said first and second transistor and said means for applying said second fixed potential.

4. The interface circuit recited in claim 3 wherein the semiconductor junction between said base and said collector of said second transistor conducts whenever said output interface signal exceeds said first predetermined value and said bias resistor is selected to prevent signals at said input terminal of said logic circuit from exceeding said second predetermined value.

5. The interface circuit recited in claim 4 wherein said DC path comprises:

first and second resistor of substantial equal value connected in series between said first and second input terminals; and a third resistor connected between the common junction point of said first and second resistors and said output of said logic circuit.

6. The interface circuit recited in claim 5 wherein said AC impedance means comprises:

a first capacitor connected between said common junction point of said first and second resistor, said third resistor and said first capacitor forming a low pass filter to prevent said interface circuit from oscillating; and a second capacitor connected between said second input terminal and said common junction point of said first and second resistors.

7. The interface circuit recited in claim 6 wherein said logic circuit and said output logic circuit are of the same logic family.

8. The interface circuit recited in claim 7 wherein said logic circuit and said output logic circuit are each a NAND gate having an extender input.

9. The interface circuit recited in claim 8 wherein said input signal is a random noise signal generated by a circuit having an output terminal coupled to said first input terminal and comprising:

a random noise source for generating a random noise signal consisting essentially of pulses occurring at random intervals, having random durations and amplitudes;

amplifier means adapted to equally amplify positive and negative going signals;

a high pass filter circuit coupling said random noise signal to the input of said amplifier; and means for coupling only the AC portions of the signal generated at the output of said amplifier to said first input terminal.

10. The circuit recited in claim 9 wherein said random noise source includes a zener noise source and means to bias said zener noise source in its avalanche region of operation to generate said random noise signals.

11. A random noise circuit comprising:

a random noise source for generating a random noise signal consisting essentially of pulses having random durations and amplitudes and occurring at random intervals;

amplifier means responsive to said random noise signal for equally amplifying positive going and negative going portions of said random noise signal and generating an amplified random noise signal;

an output logic circuit; and interface means including a logic circuit compatible with said output logic circuit responsive to said amplified random noise signal for equally amplifying positive going and negative going portions of said amplified random noise signal and interfacing said amplifier means to said output logic circuit;

said output logic circuit generating a random noise signal consisting essentially of pulses having random durations and substantially uniform amplitudes and occurring at random intervals.

* * * * *